United States Patent [19]

Kempner et al.

[11] 4,319,894

[45] Mar. 16, 1982

[54] PROCESS AND PROCESS APPARATUS FOR SEPARATING GASEOUS PHOSPHORUS TRICHLORIDE FROM A GAS STREAM

[75] Inventors: Alan L. Kempner, Yonkers; Robert H. Kaplan, New City, both of N.Y.

[73] Assignee: Stauffer Chemical Company, Westport, Conn.

[21] Appl. No.: 951,689

[22] Filed: Oct. 16, 1978

[51] Int. Cl.$^3$ ............................................ B01D 57/00
[52] U.S. Cl. ........................................ 55/71; 55/310; 422/117; 423/300
[58] Field of Search .................... 423/300; 55/71, 310, 55/385 C; 422/117; 220/85 V, 85 VR, 85 S, 89 A; 137/587

[56] References Cited

U.S. PATENT DOCUMENTS

| | | | |
|---|---|---|---|
| 138,171 | 4/1873 | Matthews | 220/89 A |
| 2,026,714 | 1/1936 | Thompson et al. | 422/117 |
| 2,199,797 | 5/1940 | Hunter | 55/71 |
| 2,580,635 | 1/1952 | Winter, Jr. | 55/71 |
| 3,582,262 | 6/1971 | Tomany | 55/71 |
| 3,937,616 | 2/1976 | Cremer et al. | 422/117 |
| 3,981,156 | 9/1976 | Modisette | 220/85 VR |

FOREIGN PATENT DOCUMENTS 688525  3/1953  United Kingdom .................. 55/71

*Primary Examiner*—Norman Yudkoff
*Attorney, Agent, or Firm*—Vivienne T. White

[57] ABSTRACT

A process is provided for separating gaseous phosphorus trichloride from a gas stream. The process comprises contacting the gas stream with a condensing amount of liquid phosphorus trichloride to c ondense a portion of the gaseous phosphorus trichloride to liquid phosphorus trichloride. The liquid phsphorus trichloride is then separated from the gas stream. A process apparatus is also provided. The process is particularly useful in preventing or reducing the discharge of gaseous phosphorus trichloride to the atmosphere due to the accidental discharge of a high volume gas stream from a phosphorus trichloride reaction vessel.

6 Claims, 1 Drawing Figure

U.S. Patent  Mar. 16, 1982  4,319,894
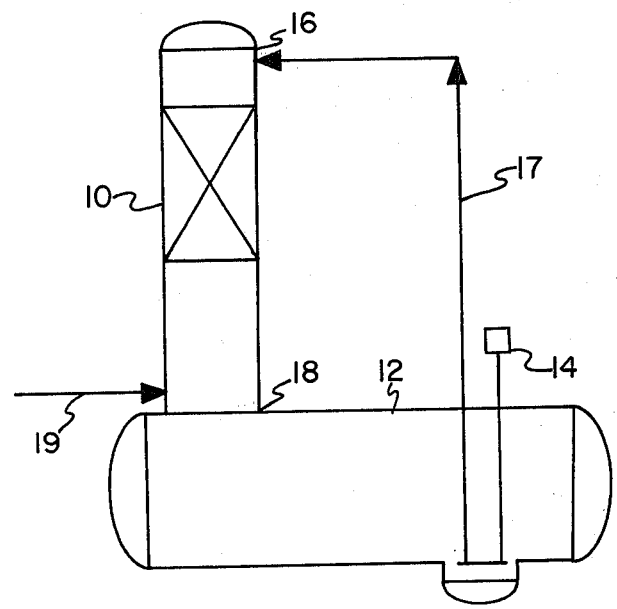

PROCESS AND PROCESS APPARATUS FOR SEPARATING GASEOUS PHOSPHORUS TRICHLORIDE FROM A GAS STREAM

BACKGROUND OF THE INVENTION

1. Field of the Invention

This invention relates to a process and process apparatus for separating gaseous phosphorus trichloride from a gas stream. The process and process apparatus are particularly useful in preventing or reducing the discharge of gaseous phosphorus trichloride to the atmosphere during the accidental discharge of high volumes of gas from a phosphorus trichloride reaction vessel.

2. Prior Art

One process for making phosphorus trichloride, for example, is to introduce chlorine gas into a layer of liquid phosphorus trichloride containing dissolved phosphorus; the layer resting upon a charge of phosphorus. Chlorination of the phosphorus dissolved in the phosphorus trichloride takes place. Concurrently, with its formation the liquid phosphorus trichloride is distilled off by means of the heat of reaction.

Another process for making phosphorus trichloride is described in British Pat. No. 688,525. This reference describes the introduction of chlorine gas directly into the liquid phosphorus. Phosphorus trichloride vapor is formed by the reaction of chlorine with phosphorus and is led away from the liquid phosphorus and then liquefied by cooling.

Both of these methods of producing phosphorus trichloride result in a gaseous phosphorus trichloride stream. The main product stream is then condensed to liquid phosphorus trichloride by conventional condensing apparatus, for example surface condensers, e.g. air or liquid cooled tubular condensers.

However, during the accidental discharge of a gas stream from a phosphorus trichloride reaction vessel (usually from an emergency pressure relief means), the conventional condensing apparatus utilized to condense the main product stream of gaseous phosphorus trichloride is by-passed thus causing a discharge to the atmosphere of high volumes of gas containing phosphorus trichloride, hydrogen chloride, chlorine and small quantities of phosphorus and inerts.

In order to avoid air pollution problems from such accidental discharges it has been the practice to install, for example, water and/or caustic absorption process equipment to remove the phosphorus trichloride from the gas stream. Such processes are replete with problems. A major disadvantage of such processes is that the phosphorus trichloride is hydrolyzed forming excessive amounts of heat which are difficult to dissipate. Additionally, there are formed products which are difficult to recover and which create secondary waste disposal problems such as water pollution and air pollution problems. For example, the use of the caustic absorption process can result in the formation of phosphine, an explosive gas.

British Pat. No. 688,525 describes a prior art process for removing impurities, such as phosphorus, tarry ingredients and the like, by washing phosphorus trichloride vapor with a liquid phosphorus trichloride. This prior art process, however, does not result in the condensation of any of the phosphorus trichloride; condensation being performed by other methods. Additionally, this prior art process is not utilized to prevent or reduce the discharge of gaseous phosphorus trichloride to the atmosphere during the accidental discharge of high volumes of gas from a phosphorus trichloride reaction vessel.

SUMMARY OF THE INVENTION

It is thus an object of the invention to provide a process and process apparatus for separating gaseous phosphorus trichloride from a gas stream, and more particularly for preventing or reducing the discharge of gaseous phosphorus trichloride to the atmosphere due to the accidental discharge of a high volume gas stream from a phosphorus trichloride reaction vessel.

The process comprises:

(a) contacting the gas stream with a condensing amount of liquid phosphorus trichloride to condense a portion of the gaseous phosphorus trichloride to liquid phosphorus trichloride; and (b) separating the liquid phosphorus trichloride from the gas stream.

BRIEF DESCRIPTION OF THE DRAWINGS

Other features of the invention, together with other objects and advantages of the invention, will become apparent upon reference to the specification, the claims and the drawing, wherein:

The one FIGURE is a diagrammatic representation of an embodiment of an apparatus which may be utilized to carry out the process of this invention.

DETAILED DESCRIPTION OF THE INVENTION

The process and process apparatus of this invention are utilized to separate gaseous phosphorus trichloride from a gas stream containing the gaseous phosphorus trichloride. The process may be utilized on any type gas stream containing gaseous phosphorus trichloride, but finds particular commercial value in preventing or reducing the discharge of phosphorus trichloride to the atmosphere during the accidental discharge of a high volume gas stream from a phosphorus trichloride reaction vessel. Such a discharge (usually from an emergency pressure relief means) generally bypasses the conventional condensing apparatus used in producing phosphorus trichloride.

Generally, the process and process apparatus of this invention are useful when such gas streams contain from about 20% to about 100% (by volume) phosphorus trichloride, preferably about 50% to about 100%. Generally at a content of gaseous phosphorus trichloride below 20%, very little phosphorus trichloride will condense out, due to the fact that at the discharge temperature of such gas stream the vapor pressure of the phosphorus trichloride will be greater than the partial pressure of the phosphorus trichloride, and no condensation of the phosphorus trichloride will take place.

Typically these accidentally discharged high volume gas streams additionally contain other impurities such as hydrogen chloride, chlorine and small quantities of phosphorus and inerts.

The process and process apparatus of this invention are advantageous in that the other impurities contained in the gas stream may not find their way into the liquid phosphorus trichloride produced and thus do not contaminate the liquid product phosphorus trichloride, however, if such impurities do find their way into the liquid phosphorus trichloride, they can be easily removed with existing plant equipment which is utilized to process the main stream of phosphorus trichloride. Additionally, this process and process apparatus have the particular advantage of not producing any secondary waste disposal problems or process problems usually associated with absorbing phosphorus trichloride in water and/or caustic.

The process is comprised of contacting the gas stream with a condensing amount of liquid phosphorus trichloride to condense a portion, preferably a major portion, of the gaseous phosphorus trichloride to liquid phosphorus trichloride. The contacting is preferably carried out by a contacting means in a continuous counter-current manner well known in the art, e.g. packed towers. In a packed tower, typically, the gas stream is injected at the bottom and the liquid phosphorus trichloride injected at the top. The liquid phosphorus trichloride flows down the tower, contacts the gas stream and condenses the gaseous phosphorus trichloride to liquid phosphorus trichloride. The liquid phosphorus trichloride is carried, by gravity, down to the bottom of the tower where it is collected. Other methods of carrying out the process of this invention may be utilized, but the foregoing is the most preferred.

At atmospheric pressure, the pressure at which it is most economical to carry out this process, the gaseous phosphorus trichloride is generally (although not necessarily) above its boiling point of 77° C. (167° F.). The temperature of the condensing amount of liquid phosphorus trichloride must be less than the temperature of the gaseous phosphorus trichloride, i.e. the gas stream. The temperature of the condensing amount of liquid phosphorus trichloride is preferably at a temperature of about 20° C. (68° F.) to about 40° C. (104° F.). The condensing amount of liquid phosphorus trichloride required to condense the gaseous phosphorus trichloride to liquid phosphorus trichloride can readily be determined by one skilled in the art based upon the temperature of the gaseous phosphorus trichloride, the temperature of the liquid phosphorus trichloride used to condense the gaseous phosphorus trichloride and the amount of gaseous phosphorus trichloride present in the gas stream. For general guidance, however, the weight ratio of the condensing amount of the liquid phosphorus trichloride to gaseous phosphorus trichloride should be at least about 10:1 and preferably about 10:1 to about 14:1. The maximum weight ratio is determined by the limits of the contacting means utilized.

The condensing amount of phosphorus trichloride is preferably obtained from the condensation of the main product stream by the conventional condensing apparatus, i.e. the liquid product phosphorus trichloride.

An embodiment of the apparatus which may be utilized in the process of this invention is depicted in the FIGURE. This apparatus consists of a contacting means which is a packed tower (10) surmounted on a horizontal tank (12) which is a storage means for the liquid product phosphorus trichloride. The tank (12) contains a submerged pump (14). Liquid phosphorus trichloride is continuously circulated by line (17) from tank (12) to the top (16) of the packed tower (10). The gas stream is injected by line (19) into the bottom (18) of the packed tower (10). Typically, line (19) and the gas stream conveyed by this line, come from an emergency pressure relief means attached to the phosphorus trichloride reaction vessel.

In the packed tower (10), the gas stream is cooled and the gaseous phosphorus trichloride condensed by contact with the liquid phosphorus trichloride. The liquid phosphorus trichloride is carried down the tower (10) to the tank (12).

THEORETICAL EXAMPLE

A typical high volume discharge from a phosphorus trichloride reaction vessel might produce a gas stream of 20,400 lbs./hr. (9,253 kg/hr.) at a discharge temperature of 126° C. (260° F.). 273,000 lbs./hr. (123,830 kg/hr.) of liquid phosphorus trichloride at 41° C. (106° F.) would be required to condense 20,300 lbs./hr. (9,208 kg/hr.) of the gas stream to a liquid at 65° C. (145° F.). Thus 293,300 lbs./hr. (133,037 kg/hr.) of liquid phosphorus trichloride at 65° C. (145° F.) and 100 lbs./hr. (454 kg/hr.) of noncondensable at 41° C. (106° F.) would leave the condensing means.

Although this invention has been shown and described with reference to particular embodiments, it should be understood that departures can be made therefrom within the scope of the invention as set forth in the claims.

What is claimed is:

1. In a process for preventing or reducing the discharge of aqueous phosphorus trichloride to the atmosphere due to the accidental discharge of a high volume gas stream from a phosphorus trichloride reaction vessel, the gas stream containing at least about 20% (by volume) of gaseous phosphorus trichloride, the improvement comprising:
    (a) contacting the gas stream with a condensing amount of liquid phosphorus trichloride to condense a portion of the gaseous phosphorus trichloride to liquid phosphorus trichloride; and
    (b) separating the liquid phosphorus trichloride from the gas stream; wherein the weight ratio of the condensing amount of liquid phosphorus trichloride to gaseous phosphorus trichloride is at least about 10:1.

2. The process of claim 1 wherein the temperature of the condensing amount of liquid phosphorus trichloride is less than about 77° C. (167° F.).

3. The process of claim 1, wherein the temperature of the condensing amount of liquid phosphorus trichloride is about 20° C. (68° F.) to about 40° C. (104° F.).

4. The process of claim 1, wherein the weight ratio of the condensing amount of liquid phosphorus trichloride to gaseous phosphorus trichloride is about 10:1 to about 14:1.

5. The process of claim 1, wherein the contacting is a continuous counter-current process.

6. In an improved process apparatus for producing liquid product phosphorus trichloride of the type having a storage means for a liquid product, a reaction vessel having an emergency pressure relief means for discharging a high volume gas stream only under emergency conditions, said high volume gas stream containing gaseous phosphorus trichloride from the reaction vessel at a predetermined pressure, the improvement comprising:
    (a) contacting means for contacting in a continuous counter-current manner the liquid product with the high volume gas stream;
    (b) a means for conveying the high volume gas stream from the emergency pressure relief means to the contacting means; and
    (c) a means for conveying the liquid product from the storage means to the contacting means.

* * * * *